Nov. 30, 1943.     S. J. ERRETT     2,335,500
CUTTING AND WELDING TORCH
Filed Aug. 17, 1940
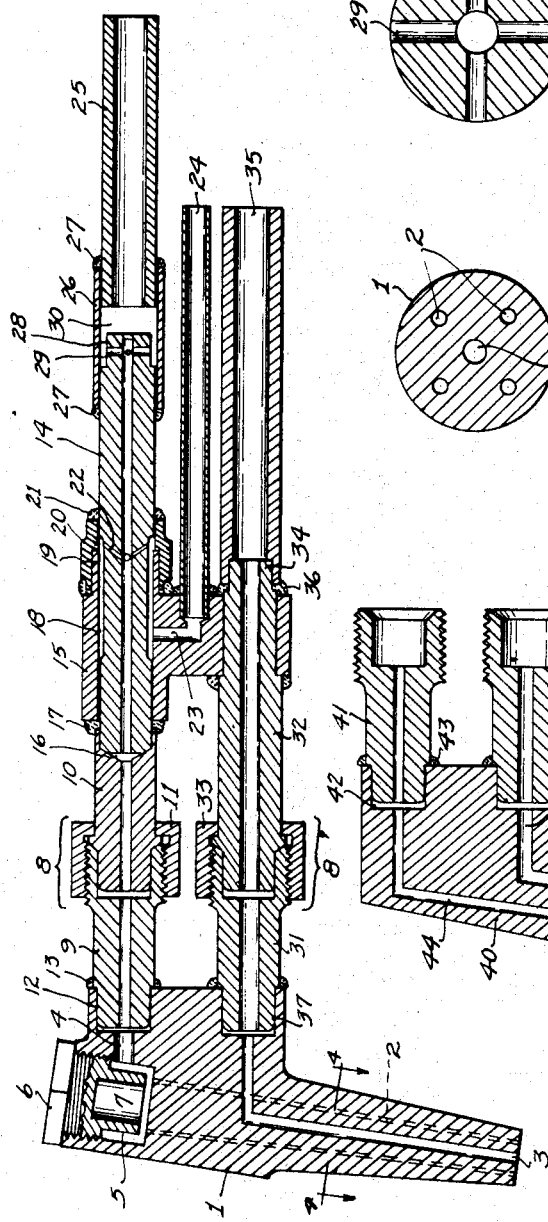
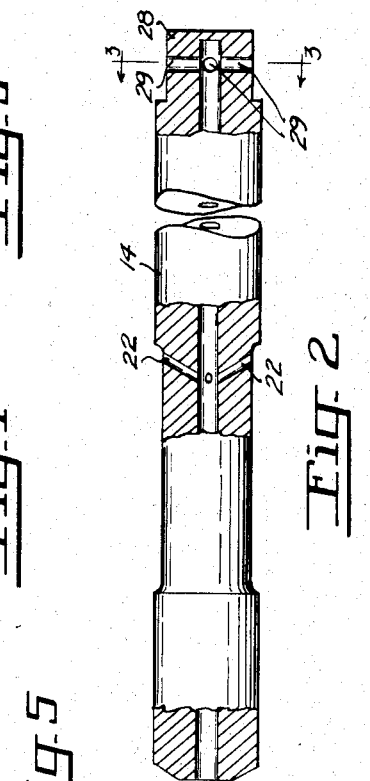
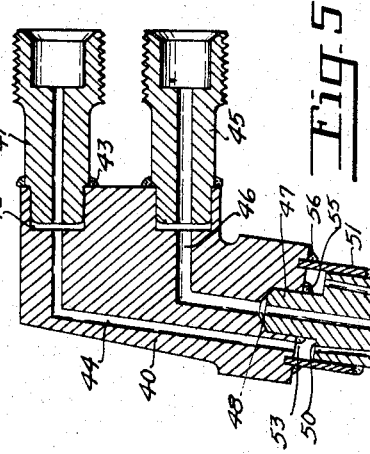
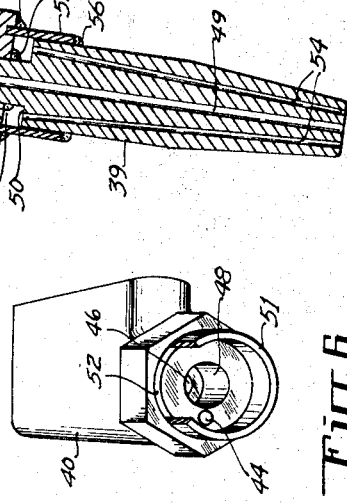
Sanford J. Errett
INVENTOR
BY Harold O. Cook
ATTORNEY Patented Nov. 30, 1943

2,335,500

UNITED STATES PATENT OFFICE 2,335,500

CUTTING AND WELDING TORCH

Sanford J. Errett, Portland, Oreg.

Application August 17, 1940, Serial No. 353,090

4 Claims. (Cl. 158—27.4)

This invention relates to improvements in cutting and welding torches, and has particular reference to improved structure for the head or tip portion of such a torch, an improved feature of the invention being to provide walls of solid metal between all passages through which the respective gases are conducted to the orifices at the end of the tip.

Primarily, it is an object of the invention to provide a construction for cutting and welding torches which precludes the leakage of the gases from their respective passages in the torch.

It is a further object of the invention to provide a construction for cutting and welding torches wherein the passages for the respective gases are separated from each other by impermeable walls of solid metal.

It is a further object of the invention to provide a construction for torches of the character described wherein the mixing chamber for the low pressure gases may be permanently sealed.

It is a further object of the invention to provide a construction for cutting and welding torches wherein metal seals may be used in place of the usual screwed in seats.

A further object of the invention is to provide a construction for cutting and welding torches which is simple to manufacture and repair, which is more rigid than constructions depending on threaded connections, and wherein expansion and contraction of parts will have no detrimental effect on the operation of the torch.

A further object of the invention is to provide a construction for cutting and welding torches wherein cutting tips may be exchanged or replaced in heat-warped torch heads without necessitating regrinding of precision seats.

These and other desired objects and advantages of the invention are obtained through the novel arrangement, the unique construction, and the improved combination of the various parts hereinafter described in connection with the accompanying drawing, it being understood that various changes in form, proportion, size and details of construction within the scope of the claims may be resorted to without departing from the spirit or sacrificing any of the advantages of the invention.

In the drawing:

Figure 1 is a longitudinal sectional view of a torch constructed in accordance with the present invention.

Figure 2 is a longitudinal elevation, partly in section, of the conduit forming the mixing chamber for the low pressure gases.

Figure 3 is a transverse section of the conduit for low pressure gases, taken on the line 3—3 of Figure 2, showing the intake ports for the low pressure oxygen.

Figure 4 is a transverse section of the cutting tip, taken on the line 4—4 of Figure 1.

Figure 5 is a longitudinal sectional view of a torch head and cutting tip, illustrating a modified construction embodying the principles of the present invention.

Figure 6 is a perspective view of the torch head illustrated in Figure 5.

Referring to Figure 1 of the drawing, a torch embodying the invention is illustrated as comprising a unitary torch head and cutting tip 1 machined from a homogeneous, solid block of metal, through which the low pressure mixed gases are conducted to the point of discharge from the tip through passages 2, and through which the high pressure oxygen is conducted to the discharge orifices through a passage 3, the several passages being defined by homogeneous walls of solid metal, there being no possible opportunity for leakage from the passages for the high pressure oxygen into the passages for the low pressure mixed gases. The low pressure mixed gases are conducted to the cutting tip by way of a passage 4 which discharges into a chamber 5 in the rear end of the tip. One end of this chamber is closed by a plug 6 having therein a pocket 7 communicating with and forming a part of said chamber 5. The passages 2 lead from said chamber to the discharge end of the tip. The chamber 5 acts as an expansion chamber for the mixed gases, and serves to prevent these gases from backfiring into the supply lines when the end of the tip becomes overheated. By removing the plug 6 the passages 2 can be cleaned by running a wire or similar instrument therethrough.

The cutting tip is removably secured to the supply lines by means of couplings, indicated generally at 8—8. One said coupling comprises a socketed member 9 receiving therein the end portion of a flanged member 10, a flanged nut 11 threadedly engaging each socketed member 9 to secure members 9 and 10 in fluid tight relation. The end of the socketed member 9 is in turn received in a socket 12 in the cutting tip, and is secured therein by means of a metal seal 13.

Incorporated in the supply pipe for the low pressure mixing gases is a conduit 14 which forms the mixing chamber for the low pressure gases. The conduit 14 extends through a housing 15, one end thereof being received in a socket 16 in the flanged member 10 forming a part of the coupling 8. In a preferred construction a flanged portion of the housing 15 is spaced from the end of the flanged member 10 to permit the application of a metal seal 17 to rigidly secure the conduit 14 in the socket 16 and the end of the flanged portion of the housing 15 to the end of the flanged member 10, as well as providing an impermeable seal for a chamber 18 presently referred to. The opposite end of that portion of the housing 15 through which extends the conduit 14 is reduced in size to make a sleeve 19 over which is received one end of a sleeve 20 which forms a closure member for one end of said chamber 18. The sleeve 20 is secured at one end to the housing 15 and at the other end to the conduit 14 by means of metal seals 21—21.

That portion of the conduit 14 received within the housing 15 and within the sleeve 20 is reduced in size to form the chamber 18 between the reduced portion of the conduit and the walls of the housing 15. Leading from the chamber 18 into the central passage of the conduit are a plurality of small passages 22, these passages 22 being inclined in the direction of flow. The passages 22 open into the chamber 18 at a point where the outer wall of the chamber is defined by the sleeve 20. Removal of the sleeve 20 uncovers the end of these passages so that rods may be inserted therethrough to remove any obstructions which may be lodged therein. Preheating gas is admitted to the chamber 18 through a passage 23 communicating with a supply pipe 24. Low pressure oxygen is admitted to the conduit 14 from the supply pipe 25, the adjacent ends of the conduit 14 and of the supply pipe 25 terminating within a sleeve 26, the sleeve 26 being secured at its ends to the conduit 14 and to the supply pipe 25, respectively, as by metal seals 27—27. The end of the conduit 14 terminates in a reduced portion 28 having radial passages 29 communicating with the longitudinal passage of the conduit, which radial passages form the intake ports for the low pressure oxygen. Thus there is formed within the sleeve 26, between the end of the supply pipe 25 and the reduced end portion 28 of the conduit 14, a chamber 30, from which the oxygen is admitted to the conduit 14 through the passages 29 to be therein mixed with the preheating gases entering the conduit 14 from the chamber 18 through the inclined passages 22.

High pressure oxygen is supplied to the passage 3 by way of the coupling comprising a socketed member 31 and a flanged member 32 maintained in fluid tight relation by means of a flanged nut 33. The flanged member 32 extends through the housing 15 and terminates in a reduced portion 34 over which is fitted the end of a supply pipe 35. A metal seal 36 at the juncture of the flanged member 32 and the supply pipe 35 forms an impermeable seal at said joint, as well as rigidly connecting said parts to the housing 15. One end of the socketed member 31 is received in a socket 37 in the cutting tip, where it is secured by a metal seal as heretofore described in connection with socketed member 9.

In operation, low pressure oxygen is admitted through valves (not shown) to the supply pipe 25, from whence it flows into the chamber 30 and through the passages 29 into the mixing chamber 38 in the conduit 14. Preheating gas is admitted to the supply pipe 24, from whence it flows through the passage 23 into the annular chamber 18. From the chamber 18 the preheating gas is admitted to the conduit 14 by way of passages 22. From the conduit 14 the mixed oxygen and preheating gas flows through coupling members 10 and 9 and passage 4 into the chamber 5 in the end of the cutting tip 1. The chamber 5 serves to permit thorough mixing of the oxygen and preheating gas and to distribute the mixed gases equally to the several passages 2.

High pressure oxygen is admitted to the supply pipe 35, from whence it flows through the coupling members 32 and 31 and is delivered to the passage 3 in the cutting tip.

Applicant has devised a construction which permits of the use of a metal seal for creating passages for the respective gases from the supply lines to the discharge orifices of the cutting tip, which passages are each defined by continuous walls of solid metal. Whenever the term "metal seal" is used in this specification, it is to be understood that it is intended to include brazing or soldering, the only limitation intended being that the metal seal be made of metal that has a lower melting point than the metal used in the construction of the various parts of the torch.

By reason of the construction hereinabove described, the cutting tip 1 is made interchangeable with other cutting tips of desired constructions by reason of the couplings 8—8. It will be appreciated that various operators have personal preferences for cutting tips embodying certain peculiar features, such as the number, the size and inclination of passages 2 for the mixed gases, and it is an advantage of applicant's construction that cutting tips may be used interchangeably therewith, to meet the requirements of any particular job.

Referring now to Figure 5, wherein is illustrated a modification of the cutting tip illustrated in Figure 1, there is provided a combined torch head and cutting tip wherein a desired construction of cutting tip 39 may be removably secured to the torch head 40 by means of metal seals, whereby the passages for the low pressure mixed gases are separated from the passage for the high pressure oxygen by continuous walls of solid metal. In the modified structure, the preheating gases are conducted to the torch head by way of supply lines, including a coupling member 41, the end of which is received in a socket 42 in the torch head 40 and secured therein by means of a metal seal 43. In the torch head the preheating gases are conducted to the cutting tip through a passage 44. High pressure oxygen is supplied to the cutting tip by way of supply lines, including a coupling member 45, which provides communication with a passage 46 in the torch head.

The cutting tip 39 is provided at one end with a reduced portion forming a stem 47 adapted to be received in a socket 48 in the end of the torch head 40. The passage 46 for the high pressure oxygen communicates with said socket, and a passage 49 extending longitudinally through said tip 39 and stem 47 forms a continuation of said passage 46, whereby high pressure oxygen is conducted to the end of the cutting tip.

The stem portion 47 of the cutting tip 39 is made longer than the depth of the socket 48, whereby the shoulder 50 on the cutting tip is spaced from the end face of the torch head 40, thus forming an annular groove between the cutting tip and the torch head. A sleeve 51 is made to fit in a circular groove 52 in the end face of the torch head, and to fit snugly over the adjacent end portion of the cutting tip 39, whereby said sleeve encloses said annular groove to creat a chamber 53. Preheating gases are supplied to said chamber 53 through passage 44 and are led from said chamber 53 to the discharge end of the cutting tip through passages 54.

In assembling the torch, the stem portion 47 of a cutting tip 39, having the requisite number and the desired inclination of passages 54, is inserted in the socket 48 in the torch head and secured therein by means of a metal seal 55, whereby passages 46 and 49 for the high pressure oxygen form a passage which is separated from the passages for the low pressure gases by continuous walls of solid metal. Thereupon, the sleeve 51 is placed over the end of the cutting tip 39 and caused to engage the groove 52 in the end of the torch head. The sleeve 51 is then secured to the torch head and to the cutting tip by means of metal seals 56 which form impermeable seals to preclude the leakage of the mixed gases from the chamber 53 to the atmosphere. The construction last above described is described and claimed in Letters Patent No. 2,239,885, granted April 29, 1941, to me for Cutting and welding torch.

An advantage of the construction hereinabove described is that the metal seals at the juncture of the torch head and cutting tip will wholly compensate for expansion or contraction of the parts due to variations in temperature. Another advantage resides in the fact that the torch head 40 may be made made a standard part, and that merely by melting the seals connecting the cutting tip to the torch head, various types of cutting tips may be used interchangeably. A particular advantage of this construction is that it does not require the use of special tools for manufacturing and repairing the torch, and that it is possible to secure a new cutting tip to a heat-warped torch head without the use of special equipment for grinding precision seats, as would be necessary if the seal between the passages for the respective gases were dependent upon screw threads and precision seats. It will be appreciated, however, that with applicant's new and novel arrangement of parts, an exchange of cutting tips can be accomplished merely by disconnecting the coupling members 8—8, rather than by removing the cutting tip from the torch head by melting the seals 55 and 56.

Having now described my invention and in what manner the same may be used, what I claim as new and desire to protect by Letters Patent is:

1. A cutting torch comprising a unitary torch head and cutting tip machined from a homogeneous, solid block of metal, passages extending through said torch head and tip for high pressure oxygen, passages extending through said torch head and tip for low pressure gases, said several passages being defined by homogeneous walls of solid metal.

2. A cutting torch comprising a unitary torch head and cutting tip machined from a homogeneous, solid block of metal, passages extending longitudinally through said torch head and tip for high pressure oxygen, passages extending longitudinally through said torch head and tip for low pressure gases, transverse passages through said head communicating with said high pressure and low pressure passages, respectively, said several passages being defined by homogeneous walls of solid metal, supply lines for supplying respective gases to said torch head and tip, each said supply line including a coupling portion having one end integrally united to said head in communication with corresponding ones of said transverse passages, the opposite ends of said coupling portions being adapted to be held in fluid tight relation by screw threads at a point remote from said tip whereby said torch head and tip may be used interchangeably with cutting tips of varying constructions.

3. A cutting torch comprising a unitary torch head and cutting tip machined from a homogeneous, solid block of metal, passages extending through said torch head and tip for high pressure oxygen, passages extending through said torch head and tip for low pressure gases, said several passages being defined by homogeneous walls of solid metal, supply lines for supplying gas to said torch head and tip, a mixing chamber in one of said supply lines, means to admit separate gases to said mixing chamber, and coupling means in said supply lines between said mixing chamber and said torch head at a point remote from said tip whereby the torch head may be used interchangeably with torch heads of varying constructions.

4. In cutting and welding torches, a unitary torch head and tip machined from a homogeneous, solid block of metal and having a chamber in the rear end of the head, a transverse passage for admitting low pressure gases to said chamber, longitudinal passages leading from said chamber to the discharge end of the tip, a longitudinal passage through said structure for high pressure gases, a transverse passage in said head for admitting high pressure gases to said last mentioned passage said several passages being defined by homogeneous walls of solid metal.

SANFORD J. ERRETT.